3,485,776
NOVEL STARCH COMPOSITION AND
METHOD OF PREPARATION
Robert L. Bruner and Donald W. Rahmes, Hinsdale, Ill., assignors to Corn Products Company, a corporation of Delaware
No Drawing. Filed Oct. 27, 1967, Ser. No. 678,500
Int. Cl. C08b 25/02, 27/52; C09j 3/06
U.S. Cl. 260—17.3       35 Claims

ABSTRACT OF THE DISCLOSURE

Covers a modified starch composition. Particularly covers a product prepared by reacting granular starch with urea or melaminealdehyde resins in specified proportions. Product is useful as a binder for non-woven fabrics and for other purposes. Also covers a method of preparing the above defined composition.

Specification

Starch compositions have been utilized in innumerable and diverse industrial applications, as, for example, coatings, sizing agents, adhesives, etc. While such starches, often in derivatized or modified form, have a long history of utility in such applications there is a continual need to meet broadening industrial needs imposed by new and modified processing means.

As an example process advances in many areas have given rise to a variety of bonded fabric compositions such as apparel fabrics, and also to fabrics to be used as chemical filters or the like. The role of the binder, of course, is to hold together a fiber mass, of which the fibers themselves have substantially no cohesion. Therefore, integrity must be imparted to the bound fabric through the application of a binder where, mose recently, starch-based binders have been largely or mainly replaced by synthetic polymer products of superior properties. As a general case, it is commonly necessary that the filter binding agent possess a substantial "wet strength" or solvent resistance in order that the filter element may be used for the filtration of liquids. Heretofore, such resistance or durability has been generally lacking in starch compositions, and while found to some degree in certain synthetic polymers, these latter are costly and not necessarily of broad utility. And in special cases where starch products have managed to maintain acceptability through a combination of economy and performance, it has been common for the starch manufacturer to meet the requirements of a limited market only through specialty processing at a marginal profit.

Another traditional area for the application of starches is in imparting a desired viscosity level to various liquids such as, e.g., synthetic polymer compositions. But again, in the recent past various derivatized cellulose products, salts of polyacrylic acid and the like, have proven superior in properties to starch although more costly to the user.

Therefore, it is an obvious advance in the art to provide a starch composition which exhibits not only the economics inherent to its class, but also competes on its merits as a binder in non-woven textile fabrics and filter elements; has superior utility over competing products as a thickener and extender in liquid synthetic polymer compositions; and has a superior utility in ease of handling, formulation and application.

Thus, it is an object of the present invention to provide a novel starch composition having valuable and improved properties in a wide number of end-uses, and having superior economy in many end-uses to which synthetic polymers have been applied.

A more specific object of the invention is to provide a starch composition which is useful as a binder from non-woven fabrics whereby chemical filters of improved utility and economy are formed.

A further object of the invention is to provide a starch composition having particular utility in the thickening and extending of fabric-laminating adhesive polymer compositions.

A still further object of the invention is to provide a starch composition product which readily reconstitutes in water to serve as a rapidly-prepared, especially convenient adhesive, binder and extender for a plurality of applications.

Yet another object is to provide a method of preparing the above product.

Other objects will appear hereinafter.

Broadly speaking, the product of the invention is the reaction product of a urea or melamine-aldehyde condensation resin with granular starch. It is important that the starch and resin be actually reacted since only limited utility to the various proposed applications occurs when the ingredients are merely admixed, as is common in the art.

The proportions of the two reactants have been found to be quite important. We have found that the amount of resin to starch should vary from about 0.6:1 to about 2:1, and more preferably from 0.6:1 to 1.5:1. Expressed in a different light, the reaction mixture should be composed of at least about 37.5% resin based on the total weight of starch and resin present. If, for example, one deviates from this and utilizes less resin than just set out, the resultant product will be proportionately less efficient as a binder for fibers or non-woven fabrics. On the other hand, if one employs higher ratios of resin to starch there will be no improvement in adhesive or binder properties in the proposed applications.

In order to form the reaction products of the invention, an aqueous dispersion of granular starch and resin is prepared at a temperature preferably below the gelatinization point of the particular starch employed. The total solids content of the dispersion, including starch and resin, preferably ranges from about 5 to about 15% by weight. While more highly concentrated mixtures may be used, the resulting product will display an extremely high viscosity resulting in handling problems, and will also usually have inferior properties. The pH level of the mixture suitable may vary over a wide range. For example, the pH of the slurry during reaction may range from about 3 to about 11.5, but more preferably will fall in the range from about 6 to about 8.5.

The starch source itself may be widely varied although an unmodified granular starch is preferred as a general rule. Thus, for example, the starting starch material used in practicing the invention may be derived from any root, grain or pith source, such as, for example, corn, wheat, potato, tapioca, rice, sago and grain sorghum, although it is preferred to use starches containing a substantial level, i.e. at least about 10 percent, of amylose. Such preferred starches are, for example, potato starch and ordinary commercial corn starch.

The resins used to react with the starch are formed by reacting urea or melamine with an aldehyde which is capable of reaction with the urea or melamine material. Mixtures of the urea resin or melamine resin may also be reacted with starch. Typical reactive aldehydes include formaldehyde, acetaldehyde, acrolein, alpha-methyl acrolein, crotonaldehyde, alpha-chlorocrotonaldehyde, alpha-methyl-beta-ethyl acrolein, beta-chlorocrotonaldehyde, alpha-bromo-crotonaldehyde, alpha-propyl acrolein, etc. By far the most preferred resins which are used to react with the starch are urea-formaldehyde and melamineformaldehyde resins, with the former being most preferred.

As mentioned above, the reaction may be run over a wide pH range. However, products appear to have greater utility, particularly as binders, when the pH of the final product is adjusted to fall within the range of 4.5 to 7.0. A product of this type is surprisingly amenable to spray-drying to a composition which readily reconstitutes in cold water for use, and which otherwise may be applied as a more-or-less dilute paste in some applications without resort to a drying step. Of course, it may be preferred that the product be dried since suitably dried products have certain valuable properties not found in the wet paste and since drying reduces product bulk and hence the costs of shipping and storage.

Under the proper conditions, we have found the reaction to reach completion with surprising speed, thus lending itself to a continuous (as opposed to batch) process. For example, given the mixture, 5 parts of resin with 6 parts of corn starch in 100 parts of aqueous dispersion at pH 7.5, the reaction will be substantially complete already upon attaining the temperature about 78–79° C. at the highest possible rate of heating. At lower terminal temperatures, e.g., about 68–70° C., a reaction period of up to 30 minutes may be required. And at intermediate terminal temperatures, e.g., in the range 72–77° C., the necessary reaction time may vary from as little as one to as much as twenty minutes. Thus, the reaction may be run over a period of time ranging from a few seconds up to thirty minutes depending upon temperature and other variables and whether a batch or continuous operation is being effected.

Typically, at conclusion of the reaction a 11 percent solids reaction product will normally have a viscosity less than about 5000 Brookfield units, measured on the hot paste.

While we would not wish to be limited by the following description of what occurs during the reaction, we have found that, with certain resin and starch combinations, a phenomenon occurs as set out below.

In one specific embodiment, a slurry made up of dry granular corn starch and urea-formaldehyde resin in water is heated at a rate of about 5° C./minute. That is, throughout the range of 60–78° C. the mixture is continually heated at this rate until reaction is considered complete. Microscopic examination of the reaction mixture as it appears during the course of heating, gives an indication of the unique nature of the compositions of this invention. It is found that the granules of starch in the reaction mixture gradually assume the usual microscopic appearance of swollen vesicles having an apparent membranous coating, but having also an obvious interior space containing a distinct and separate phase consisting of particles or liquid droplets. Beginning with its initial swelling, the starch undergoes a gradual loss of birefringence as the temperature is increased. At the stage at which a substantial degree of swelling has occurred, but where traces of birefringence persist at the periphery of the granule, it is found that already the interior of the granule contains reaction product particles. These are readily seen, and quite commonly exhibit Brownian movement when viewed by dark-field or by phase-contrast illumination. As the reaction is fostered by increased time and temperature the number and size of these particles increases. The reaction is deemed substantially complete when the starch granules mass is substantially free of its original birefringence and when the granule vesicles are substantially completely engorged with the reaction product phase. Specifically, it is believed that the amylose fraction of starch was converted by the conditions of the reaction into a hydrosol. Under the preferred conditions the less-soluble amylopectin resisted this change. It is also thought that there is a substantial degree of reaction between the urea-formaldehyde resin and the amylose portion of the starch molecule; and that this reaction is immediate as amylose begins to diffuse from the granule, with the result that the resin-amylose product is largely retained within the granule.

While the conditions of time, temperature, pH, etc. already recited may each be varied, their effects on the total reaction are interdependent and it is important that the starch retain its swollen granular character throughout the process. This is opposed to prior art processes, wherein the starch component is already partially hydrolyzed, or where conditions resulting in extensive granule fragmentation are commonly prescribed. Thus, in our invention the use of dry granular potato or waxy maize starch in processing at pH 7.5–7.8 allows for a lower terminal temperature, such that satisfactory but not excessive swelling is reached with potato at about 65° C. and with waxy maize at about 73° C. In short, it will be apparent that, while a variety of combined conditions may serve to that end, it is of the essence of this invention that the granular starch product retain in major degree its discrete, granular character until the conclusion of the reaction phase of the process.

Urea-formaldehyde or melamine-formaldehyde resins, greatly preferred here are well-known articles of commerce and need little elaboration here. One resin suitable for use in the invention is the dimethylolurea type formed by reacting two moles of formaldehyde with one mole of urea. However, suitable resins of this type may also be formed by reacting 1.5–3 moles of formaldehyde per mole of urea.

One example of resin suitable for use in the invention is made as follows.

EXAMPLE I

Typical preparation of urea-formaldehyde resin

The following materials are charged to a reactor in the order listed.

| | Parts |
|---|---|
| 37% formaldehyde | 100.0 |
| Soda ash | 0.3 |
| Urea | 141.0 |
| Paraformaldehyde | 104.0 |
| Methanol | 28.5 |

The above mixture is heated to 94° C. (reflux condition) for 15 minutes, and then cooled to 90–92° C. The pH is then adjusted to about 5.7 by addition of sufficient amounts of 10% phosphoric acid. The reactants are held at 92° C. until the Brookfield viscosity (measured at 25° C., 50 r.p.m., on about a 63% solids product) ranges between about 800 and 1200 c.p.s. The reaction is then terminated by addition of sufficient 50% triethanolamine whereby the pH is raised to 6.9–7.5, whereafter the finished resin is cooled to room temperature. It should be understood that we would not choose to be limited to the product or process set forth above, since it is well known in the art that ureaformaldehyde resins of more-or-less identical compositions may be produced by a diversity of particular means.

EXAMPLE II

Preparation of products of invention and utility as binders

A variety of commercial starches were reacted with corn, waxy maize, and potato starch and also the freshly prepared wet slurries of "prime" starch (corn) and the so-called "middlings" starch (the impure corn starch overflow-stream from centrifugal processing; this material may have up to 10 percent nitrogenous contaminants calculated as protein). The starch samples were slurried with urea-formaldehyde resin at the resin:starch ratio of 5:6 and reacted as shown in Table I below. The starch plus resin dry solids comprised 11 percent by weight in each case, the pH level 7.5–7.7 was used for all, and each was padded onto test webs at pH 5.0 and at a solids concentration of 2.5 percent and evaluated as set out below. The results of these experiments appear in Table I.

In order to evaluate the fiber-binding properties of the products of this invention, a simple laboratory test has been devised. In outline, the test consists of padding a dilute solution of the experimental product on a standard fiber web, drying and curing the binder/web composition under standard conditions, and finally measuring the tenacity of the bound web after saturating with water. A suitable web can be prepared by carding any staple fiber or fiber mixture, and 2- to 6-ply carded webs of rayon, cotton, polyester and the like have in fact, been made and tested. However, the lightly bonded fabrics appearing under the commercial designation of "lens tissue," and consisting predominantly of staple rayon fiber, have been adopted as the standard. To achieve maximum tenacity without fiber damage all starch products of this invention have been applied at pH 5.0, although this pH is not limiting, and equal or greater tenacity values may be found within a much broader range of pH.

A standard drying period of 10 minutes at 190° F. under forced draught is followed by curing for 2 minutes at 295° F. between metal plates. To test, 3 inch by 1¼ inch strips (with their long dimension conforming to the dominant fiber orientation) are cut from the center of a 3-ply cured web. These are then doubled to the width of ⅝ inch and saturated with cold water. Finally, each strip is subjected to a breaking strain in the Model VTA tensiometer (Detroit Testing Machine Co.) which registers tenacity in pounds.

TABLE I.—COMPARISON OF COMMERCIAL STARCHES IN REACTION WITH A UREA-FORMALDEHYDE RESIN*

| Starch Type | Temp., °C | | Reaction Time, min. | Tenacity, lbs. |
| --- | --- | --- | --- | --- |
| | Start | End | | |
| Corn, dry | 60 | 79 | 3 | 3.4 |
| Corn, prime | 60 | 74 | 2½ | 3.6 |
| Corn, middlings | 50 | 82 | 10½ | 4.3 |
| Waxy maize, dry | 60 | 72 | 3 | 2.2 |
| Potato, dry | 50 | 64 | 1½ | 2.7 |

*Resin of Example I.

EXAMPLE III

Comparison of binding efficiency of products of invention and corresponding mixtures Here, a melamine-formaldehyde resin and a urea-formaldehyde resin were reacted with a starch according to the procedures already described. Likewise, mixtures of starch and urea-formaldehyde resin and starch and melamine-formaldehyde resin were prepared. Lastly, a starch material was cooked in the conventional manner. In each instance the materials prepared were tested for binding efficiency according to the test procedure set out above. Each material was padded-on as a 2.5% solids dispersion in water and cured and tested. The average tenacity values found are shown in Table II. As is evident, the reaction products of the invention are clearly superior to corresponding mixtures of resin and starch.

TABLE II—EFFICIENCY OF VARIOUS BINDERS IN BONDING RAYON FIBERS

| Binder type: | Tenacity, lbs. |
| --- | --- |
| Cooked starch | 0.2 |
| Reaction product of UF resin and starch | 4.3 |
| Starch-UF resin mixture | 2.9 |
| Reaction product of MF resin and starch | 6.2 |
| Starch-MF resin mixture | 5.6 |

EXAMPLE IV

Preparation of dry products

A batch comprising approximately 50 gallons of the product of this invention was prepared. To about 40 gallons of potable water in a jacketed reactor was added 27.5 lb. of 12 percent moisture commercial granular corn starch. After agitation to effect complete dispersal, this slurry was heated to about 135° F. and 34.5 lb. of 55 percent dry solids commercial urea-formaldehyde resin was added. The mixture was adjusted to pH 7.8 by adding caustic soda. Thereafter, steam at 45 p.s.i. was admitted to the reactor jacket resulting in heating of the reaction mixture to about 172° F. within about 7 minutes whereafter, by microscopic observation, the reaction was deemed complete. The paste product was cooled rapidly to about 160° F. and adjusted to pH 5.0 by adding concentrated muriatic acid. And finally, the paste was processed through a pilot-plant spray-dryer to yield a fluffy, granular non-hydroscopic material.

This material was examined microscopically in the dry state, and during and after contact with water. Dry, it was found to be composed of individual granules, and aggregates of a few granules, without resemblance to normal starch. When contacted by water, these granules and small aggregates were seen to swell almost instaneously to 2- to 5-fold their dry diameter and to take on the unique appearance earlier described for this product.

In other trials, wherein the above process parameters were generally observed, the paste product was dewatered by mixing the paste into an agitated 5- to 10-fold volume excess of an organic solvent, e.g., acetone, methanol, ethanol, propanol, butanol, ethyl ether etc. Such processing substantially duplicates the rapid dehydration effected by spray-drying and accomplishes one subject of this invention, viz. to provide a dried, quick-swelling starch-resin composition in granular form.

EXAMPLE V

Use as thickening agents

In the backing of tufted carpeting by current art processes it is common to prepare a latex, for example, of the carboxylated styrene-butadiene type (SBR), by thickening to a desired range, i.e., 5–10 thousand cps.; to add suitable fillers, e.g. whiting, to the level 200–600 parts per 100 parts of latex solids; and to apply the thickened and filled latex to the scrim back where it serves to anchor the tufts into the primary scrim fabric and to adhere to the tufted scrim a secondary backing of jute or other durable fabric. During subsequent heat curing of the composition, it is a common requirement that a strong bond be established between the tuft base and the secondary back within minutes, and develop to a high tenacity in the finished carpet. The marked utility of the product of this invention is illustrated by a simple test procedure, using a commercial SBR latex sold under the tradename Pliolite by Goodyear as the laminating adhesive. This composition was thickened either with a commercial sodium polyacrylate sold as Acrysol GS by Rohm and Haas or with the dry starch product of our invention as prepared according to Example IV, each at 10 dry parts per 100 dry parts SBR. To each SBR mixture was added 250 parts whiting, plus water to effect a final viscosity about 8000 cps. Brookfield. It should be noted that the extension of volume through water addition is a valuable end in itself, since it results in more "mileage" to the adhesive mix.

The above adhesive formulation were applied to the back of 2-inch wide tufted carpeting strips at 28 oz./yard$^2$ (dry weight) and the jute secondary back lightly adhered. During 15 minute drying at 280° F., subjective evaluations were made at 3 minute intervals to determine "quick-set." The results may be described as "Excellent," "Good," "Fair" or "Poor" in a rough way. Where tufting density runs to about 30 tufts/inch$^2$, "Excellent" would indicate that at least one tuft/inch$^2$ adheres completely to the secondary back and is pulled through the primary "Good" would accord with pull-through of about 1 tuft/2 inch$^2$, "Fair" would indicate "some" tuft-pulling, and "Poor" indicates none.

After 15 minutes drying at 280° F., the tenacity with which the secondary back adhered was measured in pounds of pull required to separate a 3-inch length of 2-inch width while hot. Then, after cooling for 15 minutes, a final tenacity was measured within the same bounds. The results of our comparison is shown in Table III. It can readily be seen that the products of the invention have the greater utility here compared to the prior art polymer.

TABLE III.—COMPARISON OF SODIUM POLYACRYLATE WITH INVENTION PRODUCT AS SBR-THICKENING AGENT

| Agent | Total percent Coating Solids | Quick Set at Time | | | Final Tenacity, lbs. | |
|---|---|---|---|---|---|---|
| | | 3' | 6' | 9' | Hot | Cool |
| Sodium Polyacrylate | 72 | Fair | Fair | Fair | 3 | 6 |
| Starch/UF | 69 | Good | Good | Excellent | 8 | 20 |

When used as a binder, the products of the invention show activity at addon levels ranging from about 2 to about 20%, again comparing favorably with typical binder materials used for this purpose. Thus, it can be seen that the products of the invention are excellent fiber-binding agents and may be used in treating non-woven fabrics subsequently to be employed as collar and cuff linings, bouffant linings, disposable-reusable toweling, wiping rags and the like; as well as filter media, including oil, air and milk filters, absorbent disposable sanitary fiber constructions, such as diapers and the like; as well as buffing wheels and abrasive-containing polishing wheels, and other applications whereby a binder must be utilized to make fibers strongly adhere to one another, or to bind particulate fillers or clays to a fiber base.

The starch-resin products of the invention are particularly useful as binders for rayon, cotton, or various combinations of these two textile fibers and show marked utility in treating a wide number of synthetic fibers and fiber mixtures.

In addition to the just enumerated use, the products of the invention may be used as extenders and modifiers for a large number of synthetic polymer latices and emulsions and as thickening agents for these same latices and emulsions. They have particular usefulness where the resultant latex or emulsion composition is to be extended or filled with whiting or clays for carpet backing or in conjunction with pigments for applications as water-based paints. They are useful alone as a filling binder where clays, whiting, abrasive powders, oils, pigments or oil-pigments or combination of these are to be bound to textile, paper, glass, metal, wood or other surfaces; as a laminating glue or adhesive for paper, cloth, wood, gypsum-board and the like; as a combination deflocculant and adhesive applied to a clay slip and the like in ceramic processes; as a pre-weave warp-size for cotton, cotton-polyester blends, rayon, and other common staple and filament yarns including glass fibers, etc. A preferred application lies in treating already woven textiles or paper whereby the resultant treated cellulosic articles are greatly improved with respect to strength, hand and durability.

In applying the starch/urea-formaldehyde products to synthetic latices or polymers to effect thickening, extending, modifying, etc. the product preferably is added in its dry, granular, cold-water swelling form where it thickens the latex by imbibing water. The product of the invention is thus swelled and activated so as to impart desirable rheological properties to the resultant starch-resin/polymer mix. In other applications, such as for use alone as an adhesive, the products of the invention may be applied as hot or cold pastes or dispersions, or in some applications such as in pre-weave slashing of yarns may even be pasted or cooked to some desired degree and formulated with other additives to impart the desired qualities required by the various yarn types.

While the invention has been described in connection with specific embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. A composition of matter useful as a binder for non-woven fibers and for other applications which comprises a granular starch-resin reaction product of a granular starch and a resin selected from the group consisting of urea-aldehyde resin and a melamine-resin, said product being formed by heating a reaction mixture of said starch and said resin, which reaction mixture is characterized in that the proportion of resin to starch falls within the range from about 0.6:1 to about 2:1.

2. The composition of claim 1 wherein said resin is a urea-formaldehyde resin.

3. The composition of claim 1 wherein said resin is a melamine-formaldehyde resin.

4. The composition of claim 3 wherein the proportion of resin to starch ranges from about 0.6:1 to about 1.5:1.

5. The composition of claim 2 wherein said urea-formaldehyde resin is made by reacting two moles of formaldehyde with one mole of urea.

6. The composition of claim 2 wherein said urea-formaldehyde reactant is further defined in that said resin has a Brookfield viscosity ranging from about 800 to about 1200 cps. when measured at 25° C. at 50 r.p.m. as an aqueous solution containing about 63% resin solids.

7. The composition of claim 1 which is in a physically dry form.

8. The composition of claim 1 wherein said starch is corn starch.

9. The composition of claim 1 wherein said granular starch is composed of at least 10% amylose.

10. A method of producing a composition of matter useful as a binder for non-woven fibers and for other applications which comprises the step of reacting a granular starch and a resin selected from the group consisting of a urea-aldehyde resin and a melamine-aldehyde resin in proportions of resin to starch ranging from about 0.6:1 to about 2:1 under reaction conditions such that the starch retains its granular structure as determinable microscopically throughout said reaction.

11. The method of claim 10 wherein said resin is a urea-formaldehyde resin.

12. The method of claim 10 wherein said resin is a melamine-formaldehyde resin.

13. The method of claim 10 wherein the proportion of resin to starch ranges from about 0.6:1 to about 1.5:1.

14. The method of claim 10 wherein said starch is corn starch.

15. The method of claim 10 wherein said starch contains at least 10% amylose.

16. The method of claim 11 wherein said urea-formaldehyde resin reactant is made by reacting two moles of formaldehyde with one mole of urea.

17. A method of producing a composition of matter useful as a binder for non-woven fibers and for other applications which comprises the steps of preparing an aqueous slurry containing a granular starch and a resin selected from the group consisting of a urea-formaldehyde resin and a melamine-formaldehyde resin, which reactants are present in proportions of resin to starch ranging from about 0.6:1 to 2:1, and heating said slurry for a few seconds up to 30 minutes with a temperature range of 60°–85° C. whereby said product is obtained.

18. The method of claim 17 wherein the total solids content of said slurry undergoing reaction ranges from about 5 to about 15% by weight.

19. The method of claim 17 wherein the pH of said slurry during reaction ranges from about 3 to about 11.5.

20. The method of claim 17 wherein the proportion of resin to starch ranges from about 0.6:1 to about 1.5:1.

21. The method of claim 17 wherein said resin is a melamine-formaldehyde resin.

22. The method of claim 17 wherein said resin is a urea-formaldehyde resin.

23. The method of claim 22 wherein said urea-formaldehyde resin reactant is made by reacting two moles of formaldehyde with one mole of urea.

24. The method of claim 19 wherein said reaction is run at a pH ranging from about 6 to about 8.5.

25. The method of claim 17 wherein said product in slurry form is subsequently dried.

26. A method of bonding non-woven fibers which comprises the steps of treating said fibers with a dilute slurry of the composition of claim 1 and heat-curing said treated fibers for a sufficient time to bond said fibers together by means of said starch-resin product which acts as a binder for said fibers.

27. A method of sizing paper which comprises applying to the surface of said paper a dilute slurry of the composition of claim 1 to produce a wet-sized paper article and drying said wet-sized paper.

28. A method of treating cellulosic materials to improve properties thereof which comprises the step of contacting said cellulosic material with the composition of claim 1.

29. A method of sizing textile yarns which comprises applying and affixing thereto the composition of claim 1.

30. The method of claim 29 wherein said textile yarn is a synthetic yarn.

31. The method of claim 26 wherein said resin is a urea-formaldehyde resin.

32. The method of claim 27 wherein said resin is a urea-formaldehyde resin.

33. The method of claim 28 wherein said resin is a urea-formaldehyde resin.

34. The method of claim 29 wherein said resin is a urea-formaldehyde resin.

35. The method of claim 30 wherein said resin is a urea-formaldehyde resin.

References Cited

UNITED STATES PATENTS

| | | | |
|---|---|---|---|
| 2,400,820 | 5/1946 | Glarum et al. | 260—17.35 |
| 2,838,465 | 6/1958 | Porowski | 260—17.35 |
| 3,001,985 | 9/1961 | Sowell et al. | 260—17.35 |
| 3,131,116 | 4/1964 | Pounds | 161—263 |

WILLIAM H. SHORT, Primary Examiner

E. WOODBERRY, Assistant Examiner

U.S. Cl. X.R.

117—124, 132, 139.5, 148, 155, 161; 161—261, 263, 271; 260—17.4